Patented Nov. 2, 1943

2,333,444

UNITED STATES PATENT OFFICE 2,333,444

METHOD OF PREPARING STABLE DETERGENT COMPOSITIONS

Edward A. Robinson, Mount Lebanon, Pa., assignor to Diamond Alkali Company, Pittsburgh, Pa., a corporation of Delaware No Drawing. Application September 10, 1941, Serial No. 410,323

6 Claims. (Cl. 252—135)

This invention relates to compositions comprised of an alkali metal metasilicate and an alkali metal phosphate. The compositions of the invention are intended for usage as detergents and cleansing aids in water washing processes. This application is a continuation in part of copending application, Serial No. 371,406, filed December 23, 1940, entitled Method of preparing detergent composition.

Anhydrous alkali metal phosphates of the type of sodium pyrophosphate and sodium tripolyphosphate, particularly the latter, possess the property of preventing precipitation of lime and magnesium compounds in unsoftened water and for this reason they are useful in washing operations. However, they are subject to two difficulties; the first is that the anhydrous salts, while soluble in water, are difficult to dissolve and considerable time is required to prepare aqueous solutions of them. The aforesaid copending application is directed particularly to products in which the phosphate and silicate components are combined in such manner that the speed with which the materials may be dissolved in water is greatly improved. On the other hand, alkali metal phosphates, such as sodium tripolyphosphate, sodium tetraphosphate, sodium hexametaphosphate and the like, revert to ortho form at elevated temperature, and upon reversion, lose their ability to prevent the deposition or precipitation of calcium and magnesium compounds. If such phosphates be admixed with hot liquid silicates the reversion of the phosphates to the ortho state takes place during a short period of time and the activity of such compositions, with respect to calcium and magnesium, is lost or substantially diminished. For this reason stable compositions of such products other than those obtained by dry mixing have not been available.

Yet dry mixes are most unsatisfactory from the point of view of the user because they cake during storage, the powdered or crystalline particles becoming agglomerated into hard solid masses. On the other hand, dry mixing involves health hazards and dust loss. Still more important, sifting takes place during transportation of "dry mix" products, with the components stratifying in the container to such a degree that precautions must be exercised lest a scoopful of material taken from the top of a barrel be of entirely different composition than a scoopful of material taken from the bottom. In short, dry mix products have not been satisfactory though they have been used because materials mixed in the wet way have been unsatisfactory.

Sodium tripolyphosphate under ordinary circumstances, to a large extent, has the same reversionary tendencies as sodium hexametaphosphate and sodium tetraphosphate in that all revert to the ortho form when subjected to elevated temperatures as, for example, the temperature of molten metasilicate in the presence of moisture or water. Despite this characteristic, however, I have discovered that if and when the percentage of sodium tripolyphosphate added to a molten metasilicate composition be of a given substantial amount then the tripolyphosphate does not revert to ortho form but instead is stabilized against reversion and remains unchanged to exert its full water softening properties even after long periods of storage. The invention then is directed to a composition of sodium metasilicate and sodium tripolyphosphate, the latter being present in sufficient amounts to prevent the reversion of itself to ortho state.

The amount of sodium tripolyphosphate requisite to obtain this result is in the neighborhood of 30 to 35 percent, the prevention of reversion increasing until about 40 percent is reached. Beyond this point no discernible amount of reversion takes place and, therefore, great percentages need not be used though in some instances the use of greater amounts than 40 percent may be desirable for special washing purposes.

If the amount of sodium tripolyphosphate be substantially less than 25 percent reversion takes place to such a pronounced degree that there is no appreciable advantage in using tripolyphosphate in place of one of the less active phosphate compositions such as the pyro form. Thus, in general, the compositions of the present invention are comprised of from 25 percent to 40 percent, and better still, from 35 percent to 40 percent of sodium tripolyphosphate in intimate admixture with sodium metasilicate, the degree of intimacy of admixture of the components being exemplified by that obtainable in the wet process of incorporation.

In the preparation of the products of the invention the sodium tripolyphosphate is added to the metasilicate while the latter is in the liquid or molten state and in the proportions indicated. The components are then stirred together until a mass of uniform consistency is obtained. During this time the elevated temperature necessary to prevent crystallization of the metasilicate is maintained. Afterwards the temperature is lowered or the mass is permitted to cool, whereupon the metasilicate exerts its crystallizing action and the mass solidifies to a hard, grindable cake.

Sodium metasilicate pentahydrate, $Na_2OSiO_2.5H_2O$, is the preferred silicate component but other forms of metasilicate, varying in hydration from approximately 2 molecules of water to 9 molecules of water, may be utilized. Other alkali metal metasilicate may be employed in place of sodium metasilicate and, likewise, other alkali metal forms of tripolyphosphate, such as potassium tripolyphosphate, may be employed in place of sodium tripolyphosphate.

Sodium carbonate and other alkalies which are stable at the elevated temperature of molten metasilicate may be incorporated with sodium tripolyphosphate without disturbing its stability. Thus, a typical cleansing composition of the present invention comprises, for example, 55 percent sodium metasilicate pentahydrate, 40 percent sodium tripolyphosphate and 5 percent anhydrous sodium carbonate.

As disclosed in my copending application, Serial No. 371,406, it is to be noted that materials, made in accordance with the present invention in the wet way, that is, by admixture of the phosphate component with the silicate component while the silicate is in the molten state, dissolve in water far more easily than were the two components to be added separately. This feature is of considerable importance in industrial cleansing operations where large volumes of cleansing material have to be made up from time to time.

Having described my invention, I claim:

1. The method which comprises admixing anhydrous sodium tripolyphosphate and hydrated sodium metasilicate with one another while said metasilicate is in melted condition and until a mass of substantially uniform consistency is obtained, the amount of sodium tripolyphosphate being at least 25 percent by weight and sufficient to prevent reversion of the sodium tripolyphosphate to the ortho form during admixing at the elevated temperature of the molten metasilicate, subsequently permitting said mass to cool and harden, and finally comminuting said mass, the said composition being characterized in that it is more soluble in water than a physical mixture of said components and in that the sodium tripolyphosphate component of the composition is stable against reversion for extended storage periods.

2. A process which comprises admixing an anhydrous alkali metal tripolyphosphate and a hydrated alkali metal metasilicate with one another while said metasilicate is in a melted condition and until a composition of substantially uniform consistency is obtained, the amount of alkali metal tripolyphosphate being above approximately 25 percent and sufficient to prevent reversion of the tripolyphosphate to the ortho form at the elevated temperature of admixing, then permitting the mass to cool and solidify to a hard grindable cake, and finally grinding said cake, the composition thus prepared being characterized in that the tripolyphosphate component of it is stable against reversion for extended periods of time when the composition is dissolved in water, and said composition being further characterized in that it is more readily soluble in water than a physical mixture of said components.

3. The method which comprises admixing anhydrous sodium tripolyphosphate with sodium metasilicate pentahydrate while the said metasilicate is in a melted condition until a composition of substantially uniform consistency is obtained and in such proportions that the tripolyphosphate constitutes from about 25 to 40% by weight of said composition, subsequently permitting the mass to cool and harden, and finally grinding the mass, the said composition being characterized in that the tripolyphosphate component is stable against reversion to the ortho form for extended storage periods.

4. The method which comprises admixing anhydrous sodium tripolyphosphate with a sodium metasilicate containing 2 to 9 molecules of water of hydration while the said metasilicate is in a melted condition, until a composition of uniform consistency is obtained, and in such proportions that the tripolyphosphate constitutes from about 25 to 40% by weight of said composition, subsequently permitting the mass to cool and harden, and finally comminuting the mass, the said composition being characterized in that the tripolyphosphate component is stable against reversion to the ortho form for extended storage periods after the composition has been prepared.

5. The method which comprises admixing anhydrous sodium tripolyphosphate with sodium metasilicate pentahydrate while the said metasilicate is in a melted condition, until a composition of substantially uniform consistency is obtained, and in such proportions that the tripolyphosphate constitutes from about 35 to 40% by weight of said composition, subsequently permitting the mass to cool and harden, and finally comminuting the mass, the said composition being characterized in that the tripolyphosphate component is stable against reversion to the ortho form for extended storage periods after the composition has been prepared.

6. The process which comprises admixing an anhydrous alkali metal tripolyphosphate and an alkali metal metasilicate having 2 to 9 molecules of water hydration with one another while the alkali metal silicate is in melted condition, until a composition of substantially uniform consistency is obtained, and in such proportions that the alkali metal tripolyphosphate constitutes from about 25 to 40% by weight of the admixture, permitting said mass to cool and solidify to a grindable cake and then comminuting said cake to produce a dry, granular composition, said composition being characterized in that the tripolyphosphate component of it is stable against reversion to the ortho form for extended storage periods after the composition has been prepared.

EDWARD A. ROBINSON.